United States Patent
Di Jasio et al.

(10) Patent No.: US 12,074,915 B1
(45) Date of Patent: Aug. 27, 2024

(54) CONNECTION MANAGEMENT DEVICE AND COMMON API

(71) Applicant: Amazon Technologies, Inc., Seattle, WA (US)

(72) Inventors: Lucio Di Jasio, Sammamish, WA (US); Shyam Krishnamoorthy, Redmond, WA (US); Jacobus Albertus van Eeden, Mercer Island, WA (US); Michael Roberts Courage, Kirkland, WA (US); Joseph Harry Julicher, Vail, AZ (US); Ming Yue, Bellevue, WA (US)

(73) Assignee: Amazon Technologies, Inc., Seattle, WA (US)

( * ) Notice: Subject to any disclaimer, the term of this patent is extended or adjusted under 35 U.S.C. 154(b) by 321 days.

(21) Appl. No.: 17/535,962

(22) Filed: Nov. 26, 2021

(51) Int. Cl.
*H04L 29/00* (2006.01)
*H04L 9/40* (2022.01)
*H04L 67/00* (2022.01)

(52) U.S. Cl.
CPC ........ *H04L 63/205* (2013.01); *H04L 63/0876* (2013.01); *H04L 67/34* (2013.01)

(58) Field of Classification Search
CPC .... H04L 63/205; H04L 63/0876; H04L 67/34
See application file for complete search history.

(56) References Cited

U.S. PATENT DOCUMENTS

| | | | |
|---|---|---|---|
| 6,754,709 B1 * | 6/2004 | Gbadegesin | H04L 61/00 709/227 |
| 8,990,398 B1 * | 3/2015 | Thrane | H04L 67/1001 709/226 |
| 10,104,538 B2 * | 10/2018 | Gattu | H04W 12/08 |
| 10,440,122 B2 | 10/2019 | Brickell et al. | |
| 10,547,590 B1 * | 1/2020 | Matthews | H04L 45/745 |
| 10,833,881 B1 * | 11/2020 | Jindal | H04L 63/102 |
| 10,887,397 B2 | 1/2021 | Matthieu et al. | |
| 11,100,197 B1 * | 8/2021 | Bernardi | H04L 63/123 |
| 11,677,748 B2 * | 6/2023 | Starsinic | H04L 63/164 713/171 |
| 2006/0059253 A1 * | 3/2006 | Goodman | G06Q 10/10 709/223 |
| 2008/0228908 A1 * | 9/2008 | Link | H04L 41/5058 709/223 |

(Continued)

Primary Examiner — Don G Zhao
(74) Attorney, Agent, or Firm — Robert C. Kowert; Kowert, Hood, Munyon, Rankin & Goetzel, P.C.

(57) ABSTRACT

A connection management device may be used to with a common API to allow a host device of a client to securely connect to a remote provider network. The host device may only be able to use a connection management device by using a defined set of commands of a common API. A hardware root of trust may be pre-provisioned with security data (e.g., client certificate, encryption keys). A connection command may be used that is not specific to any particular communication protocol (e.g., WiFi, cellular, wired protocol). In response to receiving the connection command from a host device, the connection management device may perform commands specific to the communication protocol of the connection management device to connect to a remote provider network, use the security data for authentication, and establish a connection in accordance with the communication protocol based on the authentication.

20 Claims, 10 Drawing Sheets

(56) References Cited

U.S. PATENT DOCUMENTS

| | | | |
|---|---|---|---|
| 2016/0315913 A1* | 10/2016 | Lu | H04L 67/01 |
| 2017/0257129 A1* | 9/2017 | Egner | H04W 52/0261 |
| 2017/0272972 A1* | 9/2017 | Egner | H04L 47/2441 |
| 2019/0014094 A1* | 1/2019 | Le Saint | H04L 63/0428 |
| 2019/0150134 A1* | 5/2019 | Kakinada | H04W 16/14 |
| | | | 370/330 |
| 2020/0021447 A1* | 1/2020 | Ih | H04L 9/3073 |
| 2022/0038554 A1* | 2/2022 | Merwaday | H04L 45/64 |
| 2022/0070178 A1* | 3/2022 | Lee | H04L 63/0876 |
| 2022/0078238 A1* | 3/2022 | Nixon | G06F 8/654 |
| 2022/0086218 A1* | 3/2022 | Sabella | H04M 15/66 |
| 2022/0107994 A1* | 4/2022 | Bernardi | G06F 21/105 |
| 2022/0321578 A1* | 10/2022 | Xu | H04L 63/126 |
| 2022/0358336 A1* | 11/2022 | Abolhasssani | G06N 5/01 |
| 2023/0103712 A1* | 4/2023 | Wu | H04L 63/0876 |
| | | | 726/4 |
| 2023/0344820 A1* | 10/2023 | Grillenberger | H04L 67/141 |
| 2023/0394140 A1* | 12/2023 | Orlando | G06F 21/554 |

* cited by examiner

US 12,074,915 B1

CONNECTION MANAGEMENT DEVICE AND COMMON API

BACKGROUND

The Internet of Things (IoT) is a phrase given for the interconnection of computing devices scattered around the globe within the existing internet infrastructure. Clients (e.g., customers) of a service provider may leverage the internet-based connectivity of IoT devices (also referred to herein as edge devices) to use services offered by a remote provider network of the service provider. For example, temperature sensors at a client site may collect temperature values for different equipment and transmit them to a service of the remote provider network for analysis (e.g., to determine whether if equipment at the client site needs servicing).

For an edge device to establish a secure connection with a provider network using a particular radio protocol (e.g., using a local WiFi network or cellular network), developers of the customer/client may need to use various software libraries and develop a large amount custom code for execution at the edge device. This may result in a large amount of code development on top of the development of the embedded application itself (e.g., a temperature sensing/data collection application). Moreover, different types of edge devices may use different radio protocols (e.g., WiFi, cellular) that require different types of commands in order to establish a connection with a remote provider network. Therefore, it may be quite a challenging and time-consuming process for a customer to develop the code necessary for their edge devices to securely establish a connection with a remote provider network, particularly if the customer manages a large number of edge devices that use different types of communication protocols.

While embodiments are described herein by way of example for several embodiments and illustrative drawings, those skilled in the art will recognize that the embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION

The systems and methods described herein may be employed in various combinations and in various embodiments to use a connection management device and a common application programming interface (API) to securely connect to a provider network, according to some embodiments. In embodiments, a host device may only be able to use a connection management device by using a defined set of commands of the common API. Using a connection management device and a common API to allow a host device to securely communicate and/or connect with a provider network may allow for much faster development of IoT applications for a large number of edge devices that may use different types of communication protocols (e.g., radio protocols and/or wired protocols), while at the same time providing improved data and device security, compared to traditional techniques.

In embodiments, the components illustrated in the figures may be implemented directly within computer hardware, as instructions directly or indirectly executable by computer hardware (e.g., a microprocessor or computer system), or using a combination of these techniques. For example, the components of the figures may be implemented by a system that includes one or more computing nodes, in one embodiment, each of which may be similar to the computer system embodiment illustrated in FIG. 10 and described below.

This specification begins with a description of a system for using a connection management device and a common API to securely connect to a provider network. A number of different methods and techniques are discussed for using a connection management device and a common API to securely connect to a provider network, some of which are illustrated in accompanying flowcharts. Finally, a description of an example computing system upon which the various components, modules, systems, and/or techniques described herein may be implemented is provided. Various examples are provided throughout the specification.

Figure 1:
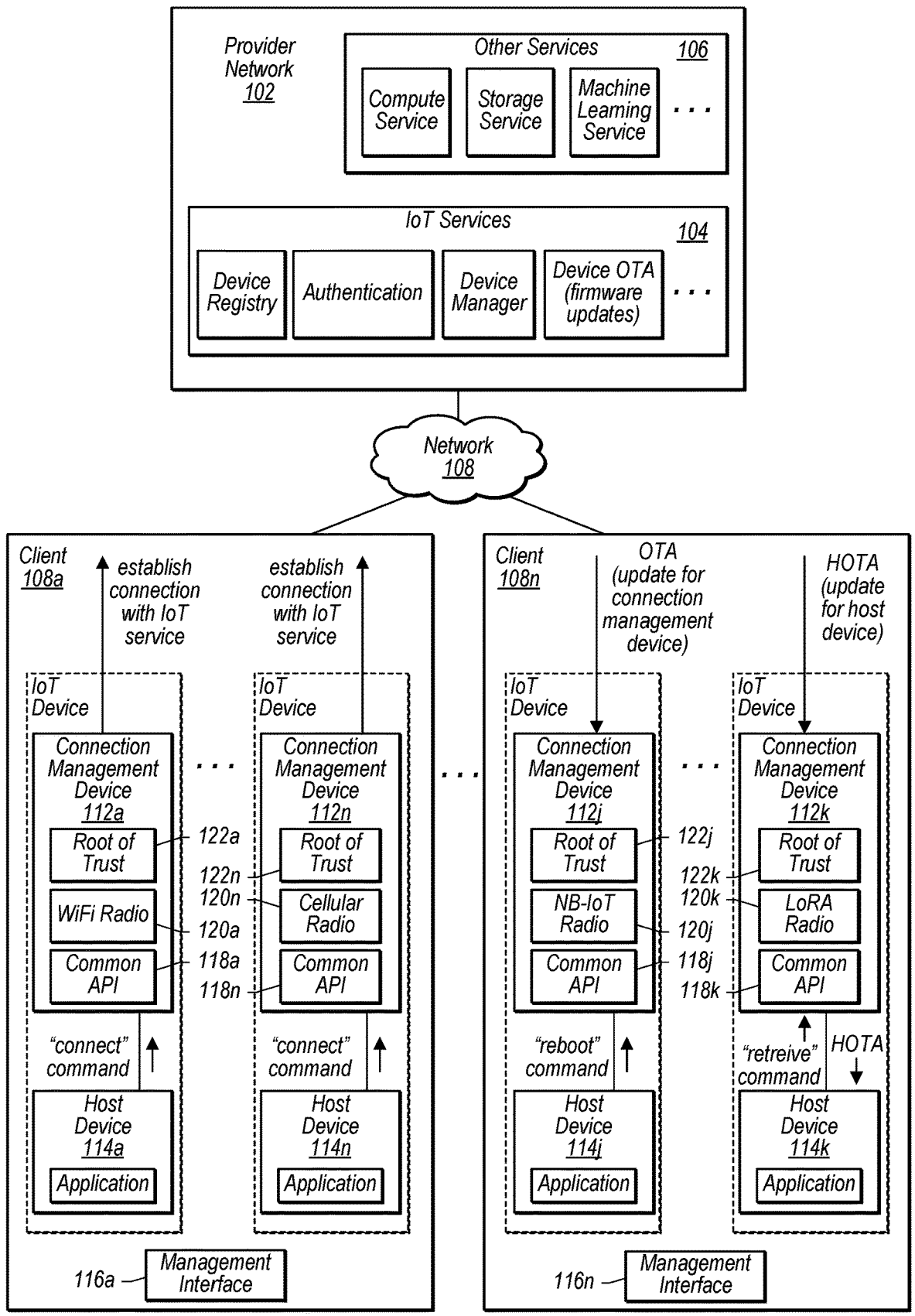
FIG. 1 is a logical block diagram illustrating a system for using a connection management device and a common API to securely connect to a provider network, according to some embodiments.

FIG. 1 is a logical block diagram illustrating a system for using a connection management device and a common API to securely connect to a provider network, according to some embodiments.

As shown, a provider network 102 may offer any number of IoT services 104 that may be used with remote edge devices of clients (e.g., a device registry, authentication services, a device manager, a device over-the-air (OTA) update service). In embodiments, the IoT services 104 may allow for communication/connections with IoT devices and/ or may be specialized for use with technology used for IOT devices.

The provider network 102 may include any number of other services 106 (e.g., a compute service, a storage service, a machine learning service) that may be considered more general types of services that may be used for IoT devices and any other types of devices/technologies (e.g., personal desktop computers, laptops). In embodiments, at least some of the IoT services 104 may communicate with at least some of the other services 106 (e.g., via provider network APIs) so that the other services may be used with IoT devices. For example, a device manager or other IoT service 104 may collect temperature sensor data from an IoT device over a secure connection and route the temperature sensor data to a compute service for analysis. Results of the analysis may be stored at a storage service.

In various embodiments, one or more of the IoT services 104 may perform any number of tasks/functionality to manage any number of edge devices for any of the customers/clients that use the IoT service for their fleets of edge devices. For example, the IoT services 104 may be used for maintaining/updating information for registered edge devices, provisioning edge devices, authentication of edge devices, and routing data to/from the edge devices to/from other services of the provider network.

In the depicted embodiment, any number of different clients/customers (e.g., clients 108*a-n*) of the IoT services 104 and/or other services 106 of the provider network may use those services via a wide area network 108, such as the internet. For example, a particular client (e.g., client 110*a*) may own/manage a network that may include any number of connection management devices 112, host devices 114, client management devices that provide management interfaces 116 for configuring/managing IoT services and other services of the provider network, and/or other devices that may communicate with any IoT services via the wide area network 108.

As shown, each client network 108 may include one or more management interfaces 116 that are implemented by one or more corresponding client management devices. A client management device may be any type of computing device that implements a user interface (e.g., graphical user interface (GUI), command line interface, and/or application programming interface (API)) that allows a user (e.g., administrator) to input/view any type of data described herein and/or perform configuration of any devices or services of the client networks or the provider network. For example, a user may use a laptop or smartphone to register any number of connection management devices (and/or any other devices) of the client network with a device registry service of the provider network so that the connection management devices (and corresponding host devices) can be used with any number of the IoT services 104 and/or other services 106.

In the example embodiment, each connection management device 112 may be connected to a corresponding host device 114. For example, the connection management device may include a serial interface that is connected to a serial interface of the host device via a serial cable. In embodiments, any other type of hardware interface/connection may be used for the connection (e.g., parallel interface/cable). As shown, each connection management device implements a common API 118 that allows a software application executing on the host device to use functionality of the connection management device by sending API commands to the connection management device via the serial interface. In embodiments, the host device is unable to communicate with the connection management device other than through the serial interface according to a defined set of commands of the common API. In embodiments, a connection management device may be designed in to be integrated with a host device in such a manner that the combination of the two forms an IoT device. For example, the connection management device 112*a* and the host device 114*a* may together be considered an IoT device.

As shown, each connection management device includes a radio 120 that is configured to communicate according to a radio protocol. For example, the radio 120*a* is a WiFi radio that uses a WiFi protocol, the radio 120*n* is a cellular radio that uses a cellular protocol, the radio 120*j* is an NB-IOT radio that uses an NB-IOT protocol, and the radio 120*k* is a LoRA radio that uses a LoRA protocol. As depicted, each connection management device also includes a pre-provisioned hardware root of trust 122 (e.g., pre-provisioned by the service provider at another location before shipment of the device to the client site for use in the client network). The hardware root of trust 122 securely stores security data configured to authenticate the connection management device with a remote provider network (e.g., client certificates, encryption keys). In embodiments, any other data and/or firmware of the connection management device may also be pre-provisioned by the service provider and/or other third-party entity/organization at another location before shipment of the device to the client site for use in the client network. As used herein, the use of the phrase "pre-provisioned" with respect to any type of data may indicate that the data was pre-provisioned by the service provider and/or other third-party entity/organization at another location before shipment of the device to the client site for use in the client network.

The common API includes a defined set of commands to use the connection management device. In embodiments, the common API may be used across any type of connection management device (e.g., devices with different radios and/or other connectivity hardware/software). For example, the API may include a connect command to connect to the provider network (e.g., "connect"). In embodiments, the connect command is not specific to any particular radio protocol and/or communication protocol. In other words, the connect command is agnostic to any specific communication protocol/radio protocol and the connection management device will connect to the provider network in response to receiving the connect command, regardless of the radio protocol and/or wired protocol used by the device (e.g., WiFi, cellular, NB-IOT, LoRA, or other radio or wired communication protocol used by the local area network and/or wide area network).

In an embodiment, the connection command does not indicate any security data to authenticate the connection management device with the provider network/service. In other words, the connection command does not indicate or include any client certificate, encryption keys, password, or other data that may be used for authentication of the connection management device. As described below, the common API may provide a simple, high-level commands (e.g., the word "connect") in order to prevent and/or restrict the host device from accessing any low-level commands and/or commands that are specific to a particular communication/radio protocol or authentication process. By doing so, the ability for a malicious actor to use a host device to perform an attack and/or to a security breach on the connection management device and/or the provider network is greatly reduced or eliminated.

In response to receiving a connection command (e.g., "connect"), the connection management device may: perform any number of commands specific to the communication/radio protocol used by the connection management device to cause the connection management device to communicate with the remote provider network, use the security data of the hardware root of trust to cause (e.g., by performing any number of security-related commands) the connection management device to be authenticated by the remote provider network and establish a connection with the remote provider network (e.g., using mutual authentication for a transport layer security (TLS) connection) in accordance with the communication/radio protocol based at least on the authentication of the connection management device using the security data stored by the hardware root of trust.

In embodiments, by handling the radio-protocol or wired-protocol specific commands, other low-level connection commands, and security/authentication-related commands to establish a secure connection with the provider network/services, the connection management device greatly reduces the time required for a customer to develop an IoT application, while providing much more robust security, compared to traditional techniques. This may also allow developers to focus on the development of the IoT application itself instead of connection and security-related coding (e.g., a sensor/data collection IoT application or other type of embedded IoT application at the host device).

Figure 6:
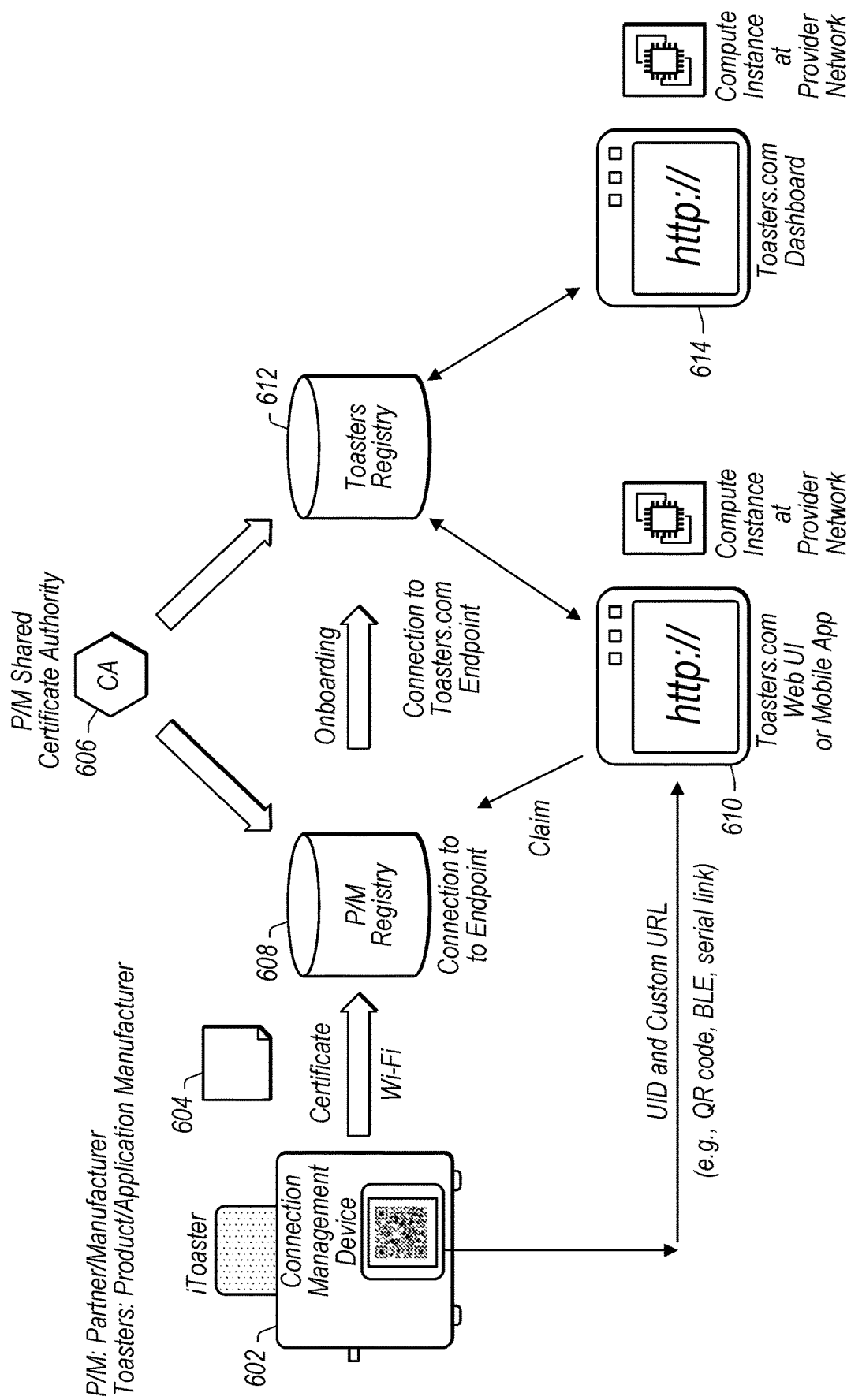
FIG. 6 illustrates an example of onboarding a connection management device, according to some embodiments.

In embodiments, the connection command does not specify an endpoint for the connection management device to connect to. For example, the command may simply be the word "connect," or another word or words that do not indicate any endpoint for the connection management device to connect to. This may be possible because the connection management device may be pre-provisioned with the endpoint information and/or may be pre-provisioned with information for another endpoint that the connection management device may connect to in order to retrieve the information for the endpoint to be used to establish a connection with the provider network. For example, prior to receiving any connection commands from a host device, the connection management device may be provisioned to automatically connect to the endpoint in response to reception of a connection command from the host device (e.g., by receiving the endpoint/network address from the provider network, another remote network, and/or a user/administrator and storing the endpoint/network address at the connection management device as part of an initial configuration/onboarding process initiated by a user/administrator). FIG. 6 provides one example of at least a portion of an onboarding process, during which the connection management device may be provisioned/configured to automatically connect to a particular endpoint in response to reception of a connection command from the host device (e.g., by storing an IP address/network address of the particular endpoint at the connection management device).

In various embodiments, the defined set of commands of the API may include any number of other commands that may be used after the connection management device has established a connection, depending on what the service provider wishes to make available for a customer/client. For example, the API may include a send command to send data to an endpoint at the provider network and/or a get command to retrieve data from the provider network or data that has already been downloaded to the connection management device.

In embodiments, the send command indicates a message and a topic. The send command causes the connection management device to publish the message to the topic. In embodiments, the get command causes the connection management device to send, to the host device, a next message of a plurality of messages at the connection management device according to an order that the plurality of messages was received by the connection management device. In embodiments, the get command indicates a topic and causes the connection management device to retrieve the most recent message that has been published to the topic.

Other commands may be used for performing OTA firmware updates for the connection management device and/or for the host device (e.g., for a processor or other hardware of the connection management device and/or the host device). Examples of these commands are discussed for FIGS. 8 and 9. Various other commands may be used, such as a subscribe command that causes the connection management device to subscribe to a topic. The host device may then retrieve messages for the topic from the connection management device.

Figure 2:
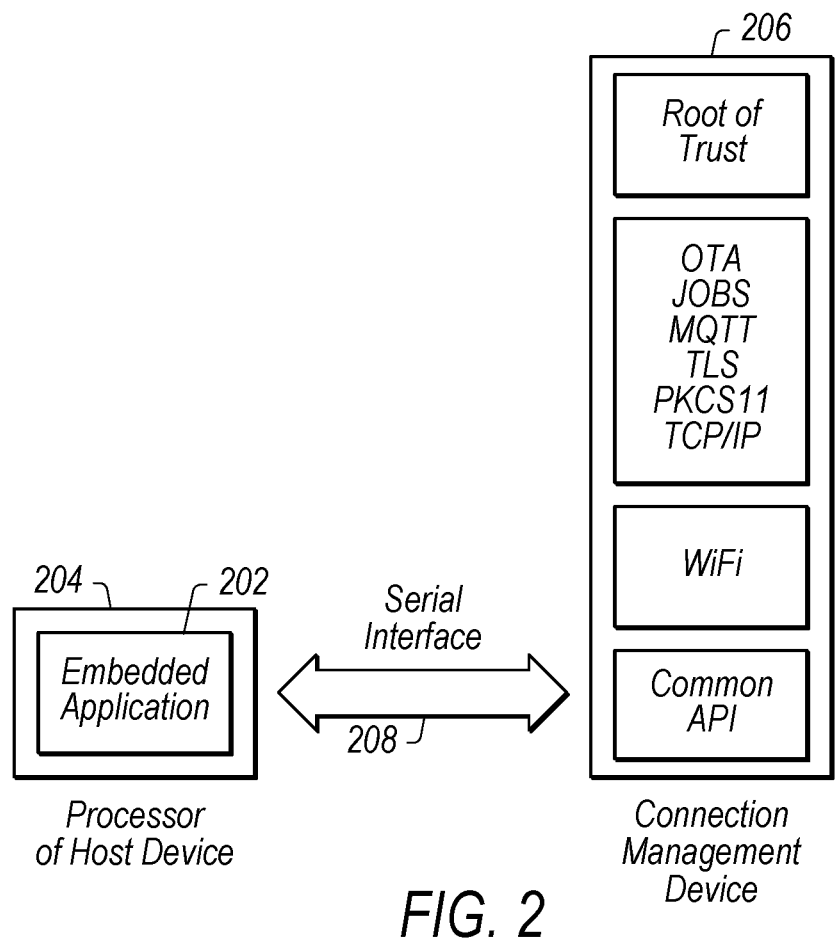
FIG. 2 illustrates an example of a connection management device communicating with an application of a host device, according to some embodiments.

FIG. 2 illustrates an example of a connection management device communicating with an application of a host device, according to some embodiments.

In the depicted embodiment, an embedded application 202 executes on a processor 204 of a host device (e.g., a host device 114 of FIG. 1) of a client network. As described for FIG. 1, a connection management device 206 implements a common API and the host device (e.g., the embedded application 202) may send a command to the connection management device 206 via a serial interface 208. As mentioned above, in various embodiments, any other suitable communication interface may be used.

As shown, the connection management device 206 includes a root of trust and a WiFi radio. As mentioned above, a connection management device 206 may instead include any other type of radio. In embodiments, the root of trust may store an identifier that uniquely identifies the connection management device 206 with respect to other connection management devices and the identifier may be provided to a service at the provider network to provide a unique identity of the device, along with any secrets (client certificate, encryption keys, etc.) that may be used to authenticate the device with the service at the provider network. The communication layer may include communication stack layers that are used for establishing a connection with the provider network (TCP/IP, PKCS11, TLS, etc.), support for MQTT, and support for any number of IoT services such as a jobs service and an OTA service. The connection management device also implements a common API, which may be the same or similar API as the common API 118 described for FIG. 1.

Figure 3:
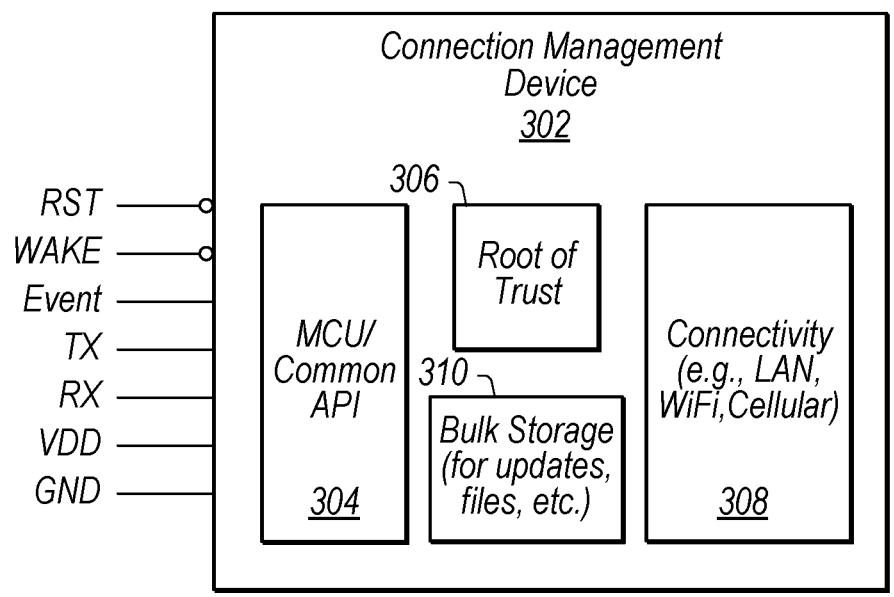
FIG. 3 illustrates an example of a connection management device, according to some embodiments.
Figure 4:
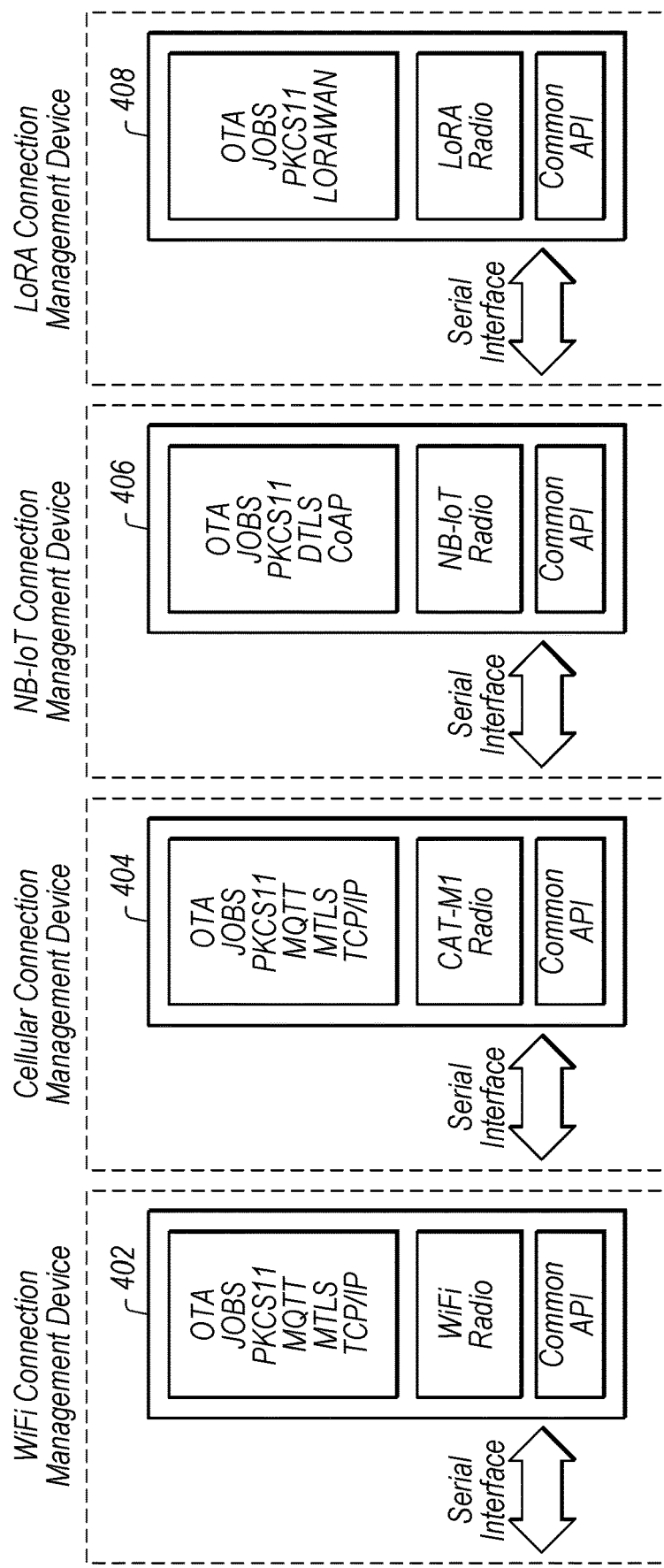
FIGS. 4A-4D illustrate examples of connection management devices that each use a different radio protocol to communicate with a provider network, according to some embodiments.

FIG. 3 illustrates an example of a connection management device, according to some embodiments.

In the depicted embodiment, a connection management device 302 includes an MCU 304 (e.g., a FreeRTOS qualified MCU). In some embodiments, the MCU may run the FreeRTOS or any other suitable operating system. The connection management device 302 also has a hardware root of trust 306 and provides connectivity 308 (e.g., software/hardware support for a particular radio protocol). For example, connectivity 308 may include a hardware/software connectivity module that supports communication via a particular radio communication protocol. In embodiments, any number of different radio communication protocols may be used by different connection management modules, where each radio communication protocol requires the use of different hardware and/or software in the connectivity module specific to the radio communication protocol (e.g., WiFi radio/software, cellular radio/software, etc.). In embodiments, connectivity 308 may include a hardware/software connectivity module that supports communication via a particular wired communication protocol (e.g., a particular wired communication protocol used by the local area network and/or wide area network). In embodiments, any number of different wired communication protocols may be used by different connection management modules, where each wired communication protocol requires the use of different hardware and/or software in the connectivity module specific to the wired communication protocol.

The connection management device also includes bulk storage 310, which may be a data store that is used to store OTA firmware updates for the connection management device or for the host device, before the updates are applied to the connection management device or host device. In various embodiments, the bulk storage may be used to store any type of data that is downloaded by the connection management device before it is retrieved by the host device (e.g., via an API command). For example, the bulk storage may store files, photos, firmware updates, software updates, and/or any other type of data.

In the depicted example, the connection management device uses seven I/O pins. The pins may include RST (input, holds the module in reset), WAKE (input, allows the connection management device to enter a low power sleep mode), Event (output, indicates to the host device that a message is available and awaiting to be delivered, TX (output to the host device), RX (input from the host device to the connection management device), VDD (power input), and GND (input, ground). As shown, the connection management device 302 also implements a common API (e.g., implemented by the processors/memory of the MCU), which may be the same or similar API as the common API 118 described for FIG. 1.

FIGS. 4A-4D illustrate examples of connection management devices that each use a different radio protocol to communicate with a provider network, according to some embodiments.

Each of the connection management devices includes a radio and implements a communication layer as well as a common API (the same or similar API as the common API 118 described for FIG. 1). In some embodiments, a connection management device may implement FreeRTOS or other type of operating system. The communication layer may include communication stack layers that are used for establishing a connection with the provider network (TCP/IP, PKCS11, TLS, etc.), support for MQTT, and/or support for any number of IoT services (OTA service, jobs service, etc.).

FIG. 4A shows a connection management device 402 that uses a WiFi radio. As shown, the connection management devices 402, 404, 406, 408 may communicate with a host device via a serial interface. In embodiments, any other type of interface may be used to communicate with the host device (e.g., a parallel interface). FIG. 4B shows a connection management device 402 that uses a CAT-MI radio, FIG. 4C shows a connection management device 402 that uses a NB-IOT radio, and FIG. 4D shows a connection management device 402 that uses a LoRA radio. As mentioned above, each of the connection management devices may implement the same common API, even though they may each use different radios/radio protocols and a different communication layer/communication stack.

Figure 5:
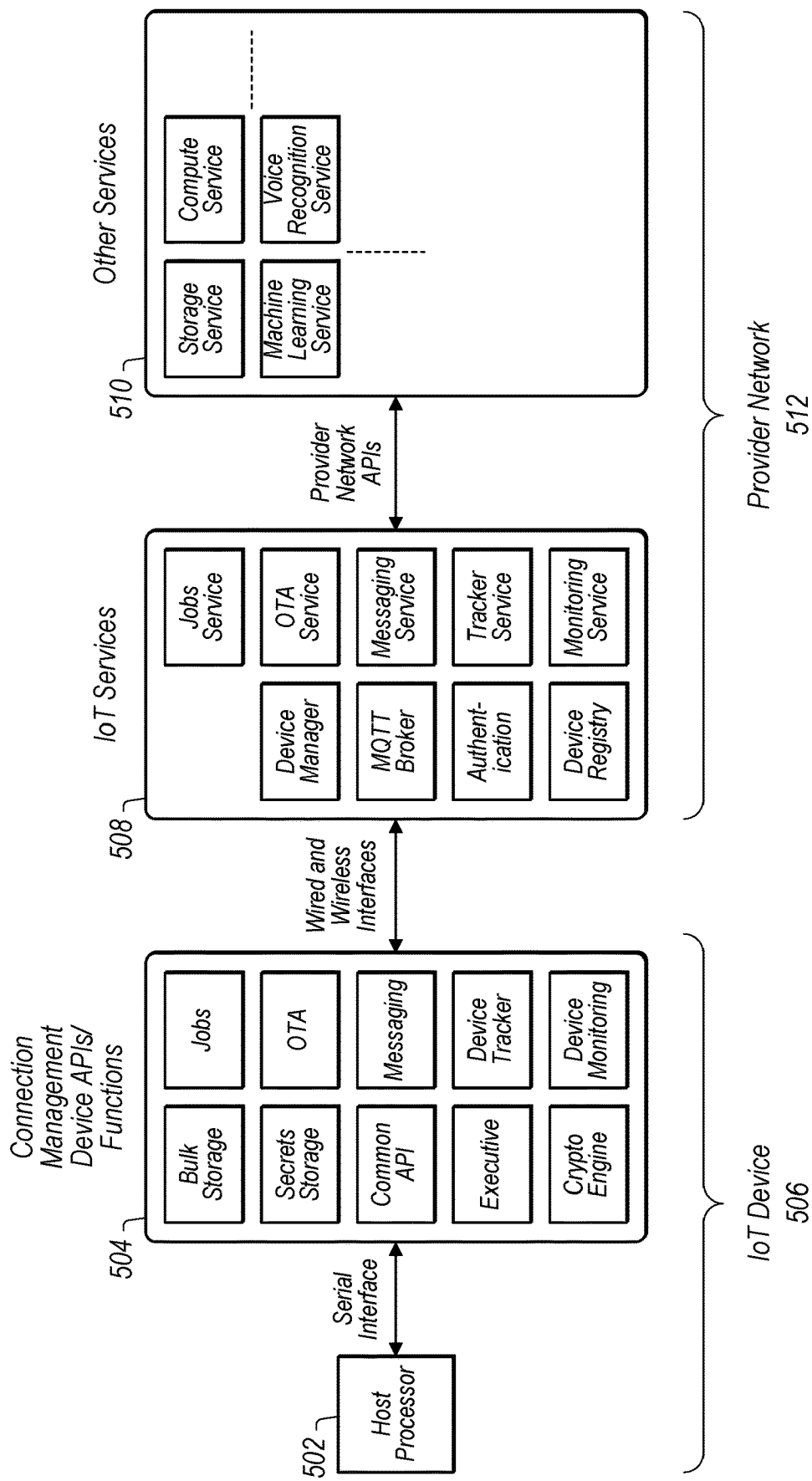
FIG. 5 illustrates a system for using a connection management device and a common API to securely connect to a provider network, according to some embodiments.

FIG. 5 illustrates a system for using a connection management device and a common API to securely connect to a provider network, according to some embodiments.

In the example embodiment, a host processor 502 of a host device and a connected management device 504 that communicate via an interface (e.g., as described in any of FIGS. 1-4) may be considered an IoT device 506. By connecting a host device to connected management device and enabling the host device/processor to send commands to a common API of the connected management device (e.g., same or similar API as the common API of FIG. 1) to perform various functions/actions (e.g., connect, send, get, etc.), a host device can be effectively transformed into an IoT device (or effectively become a part of an IoT device 506 that includes both devices).

As shown, the connected management device 504 may include any number of software and/or hardware components that each perform different functions/actions. For example, bulk storage may store data that may be used by the connected management device 504 and/or the host device/processor 502, a secrets storage may store security data in a hardware root of trust (e.g., client certificate and/or encryption keys for the connected management device 504), a common API to allow the host device/processor to cause the connected management device 504 to perform various actions, an executive to manage the execution environment and/or hardware/software components of the connected management device 504, and a crypto engine that performs various operations to enable secure storage and communication of data for the connected management device 504 (e.g., encryption/decryption functionality).

In the depicted example, the connected management device 504 may include any number of IoT service API components that allow the connected management device 504 to send and receive data (e.g., API commands, messages, etc.) to and from different IoT services 508 and/or other service 510 of the remote provider network 512. For example, a jobs API component, an OTA API component, a messaging API component, a device tracker API component, and a device monitoring API component may respectively enable the connected management device 504 to send/receive API commands to/from a jobs service, OTA service, messaging service, tracker service, and monitoring service of the IoT services 508. As depicted, the IoT services may also include a device manager service, an MQTT broker service, an authentication service, and a device registry service. Although separate services are described, in various embodiments any of the separate services may be implemented as one service (e.g., the device manager service may also implement the authentication and/or device registry).

As shown, any of the IoT services 508 may use any of the other services 510 of the provider network via provider network APIs. For example, the messaging IoT service may send data that was collected at the host device (e.g., temperature values from a temperature sensor) to the storage service for storage. As another example, the messaging IoT service may send data that was collected at the host device (e.g., temperature values from a temperature sensor) to the compute service, machine learning service, and/or voice recognition service for analysis. Results of the analysis may be sent back to the host device or another endpoint (e.g., a management device at the client's network) for display to a user.

In some embodiments, the connection management device may automatically collect data that indicates the current or recent health of the host device and/or the connection management device (e.g., according to a schedule and/or on a periodic basis) and transmit the collected data to an IoT service of the provider network (e.g., according to a schedule and/or on a periodic basis). For example, the device tracker may collect one or more performance metrics such as an amount of power consumed and/or an amount of data transmitted by the host device and/or the connection management device and transmit the collected performance metrics to the monitoring service of the provider network. In response to receiving the performance metrics, the monitoring service may send the metrics to an endpoint (e.g., user/administrator) and/or generate a health report based on the metrics and send the health report to an endpoint (e.g., user/administrator).

In various embodiments, the connection management device may automatically collect data that indicates the current or recent state/parameters of the host device (e.g., according to a schedule and/or on a periodic basis) and transmit the collected data to an IoT service of the provider network (e.g., according to a schedule and/or on a periodic basis) in order to synchronize the state/parameters of a "virtual" device maintained at the provider network with the state of the host device. For example, the device tracker may collect data from the host device that indicates a current state of multiple possible states of the host device (e.g., low power mode, hibernation, active mode, failure) and/or any number of parameters (e.g., voltages at pins, temperatures) and transmit the current state and/or parameters to the monitoring service of the provider network. In response to receiving the current state and/or parameters, the monitoring service may update the state and/or parameters of the virtual device to match the current state and/or parameters received. The service may also send an indication of the current state and/or parameters to an endpoint (e.g., user/administrator).

FIG. 6 illustrates an example of onboarding a connection management device, according to some embodiments.

In some embodiments, a connection management device (e.g., device 602) may be pre-provisioned and/or a staging account may be used as part of the activation/onboarding process in order to improve the developer and/or end user experience. The staging account may provide an out-of-box developer experience of connecting to a provider network in minutes, without requiring prior ownership of a user/client account at the provider network. This may remove hours (if not days) of laborious setup procedures that are traditionally required for activating/onboarding an IoT device. The staging account and the subsequent use of a claim API may allow an OEM/customer to create a simple and efficient end-user out-of-box experience (essentially a "late binding" process).

In embodiments, a connection management device is equipped with a pre-provisioned hardware root of trust (on chip or external secure element, secure enclave, TPM, iSIM, etc.). This may provide the necessary unique identifier (UID) of the connection management device, a key pair (public, private; e.g., an Elliptic Curve Cryptographic key pair), and may hold a certificate 604, signed by a certificate authority (CA 606) shared with the provider network. This certificate may be used to transfer the private key to a provider network endpoint 608 upon activation of the connection management device.

A connection management device that uses WiFi may need additional credentials to be set in order to connect to an available Access Point (Wi-Fi router), such as the station SSID, security method (WEP, WPA, Open, Enterprise, etc.) and the corresponding passphrase to be provided by the end-user. In embodiments, these may be submitted via the host processor through the serial interface (e.g., as parameters of a "configure" command sent to the common API), although the module may also be configured through Wi-Fi and/or Bluetooth, depending on the module specific capabilities. For Wi-Fi provisioning, the connection management device may act as an Access Point (e.g., a "soft AP"). In embodiments, this may be accomplished by accepting HTTP PUT requests to set specific parameters (e.g., requiring a custom user application) or by presenting an HTML form 610 to the user for easy entry via a web browser.

Upon first use, or following a factory reset, a connection management device may establish a connection according to the model specific connectivity capabilities (wired/wireless). In the case of connection management devices that use WiFi, this may be possible only after the end-user has provided the module with the proper Wi-Fi credentials for a local compatible WiFi Access Point (e.g., WiFi router). Each connection management device may then proceed to establish a connection with its staging account at the provider network (e.g., at one of the IoT services). The connection may be mutually authenticated using the a "birth certificate" (and a provider network server certificate), and upgraded to a secure socket connection (e.g., MTLS).

In embodiments, the birth certificate provided to the connection management device may be an X.509 certificate and may conform to a specification such as: the Common Name contains the device unique ID, the signature will be provided by an intermediate Certificate Authority that has been registered by the vendor of the connection management device with the provider network the exclusive use, and the expiration date will be set to a particular data (e.g., no less than 10 years from the device certificate issue). If successful, an automated process (e.g., JITP or similar process) will create a metadata object (and associated policies) using a template and append it to the staging account registry (e.g., the P/M registry associated with the endpoint 608). The connection management device may then proceed to login to an IoT service at the provider network (e.g., login to an MQTT broker service).

In embodiments, a manufacturer of the connection management device will be assigned a dedicated staging account and the associated unique provider network endpoint (e.g., URL) will be set as the "factory default" value for the endpoint configuration. In embodiments, the connection management device is pre-provisioned with the endpoint 608 for a staging account at the provider network, and automatically connects to the endpoint in response to activation of the connection management device by a user. A claim and transfer process may be performed in order to transfer the registration of the connection management device from the P/M registry at the endpoint 608 to an OEM registry 612 at the provider network (e.g., account owned by the OEM). The endpoint stored at the connection management device may then be updated to the new endpoint 614 (e.g., to match the OEM account).

In some embodiments a claim API may automatically update the endpoint to match the new account target. The claim API may publish the new endpoint URL on a dedicated topic reserved for this purpose (e.g., provider network/connection/endpoint/update). In embodiments, a connection management device at first activation or following a factory reset will be automatically subscribing to this topic and when receiving a new URL will update the endpoint configuration dictionary entry.

Figure 7:
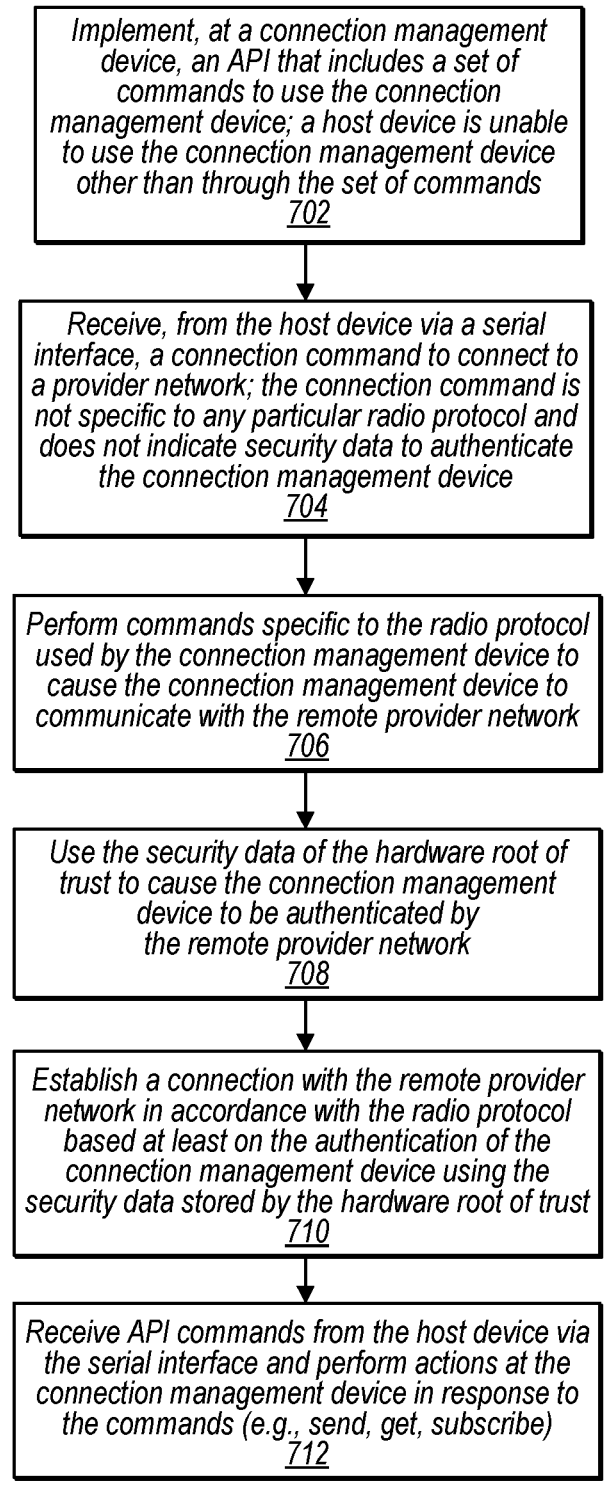
FIG. 7 is a high-level flowchart illustrating various methods and techniques to use a connection management device and a common API to securely connect to a provider network, according to some embodiments.

FIG. 7 is a high-level flowchart illustrating various methods and techniques to use a connection management device and a common API to securely connect to a provider network, according to some embodiments. In various embodiments, any of the functionality described for any portions of the flowcharts 7-9 may be performed by any of the components of FIGS. 1-6 and/or 10.

Figure 8:
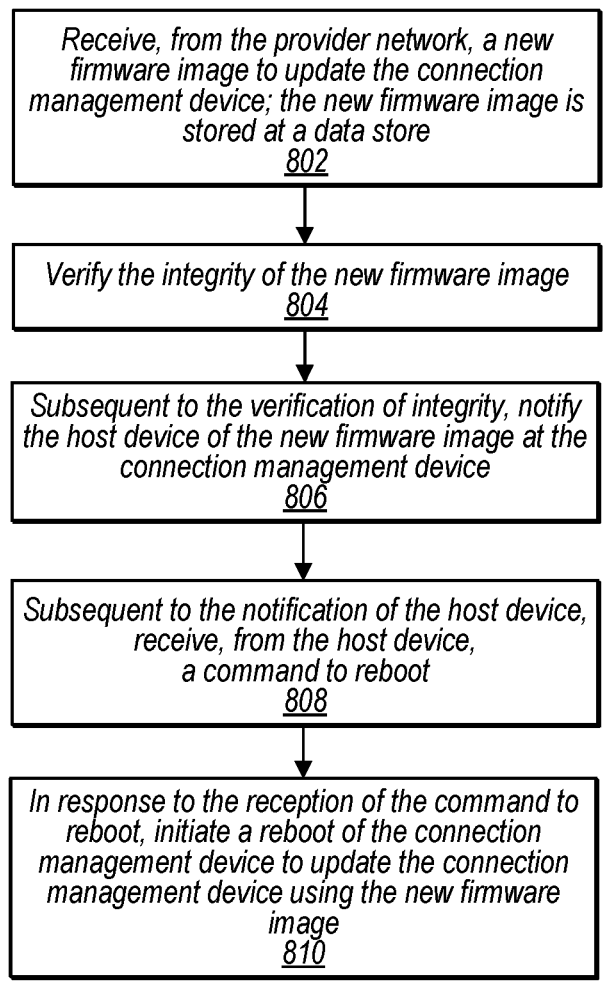
FIG. 8 is a high-level flowchart illustrating various methods and techniques to perform an over the air update (OTA) for a connection management device, according to some embodiments.
Figure 9:
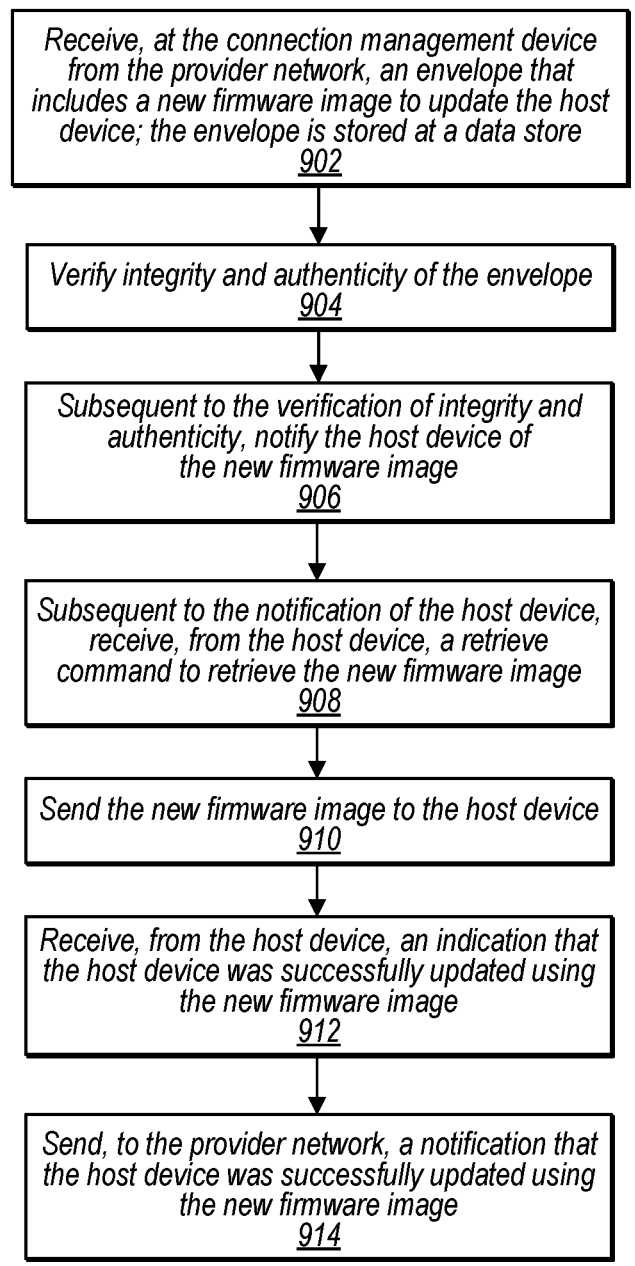
FIG. 9 is a high-level flowchart illustrating various methods and techniques to perform an over the air update (OTA) for a host device, according to some embodiments.

These techniques, as well as the techniques discussed with regard to FIGS. 8-9, may be implemented using components or systems as described above with regard to FIGS. 1-6, as well as other types of components or systems, and thus the following discussion is not intended to be limiting as to the other types of systems that may implement the described techniques. For example, any of the techniques may be implemented by one or more devices of a provider network and/or one or more devices of a client network.

At block 702, the connection management device implements an API that includes a set of commands to use the connection management device; a host device is unable to use the connection management device other than through the set of commands. At block 704, the connection management device receives, from the host device via a serial interface, a connection command to connect to a provider network; the connection command is not specific to any particular radio protocol and does not indicate security data to authenticate the connection management device.

At block 706, the connection management device performs commands specific to the radio protocol used by the connection management device to cause the connection management device to communicate with the remote provider network. At block 708, the connection management device uses the security data of the hardware root of trust to cause the connection management device to be authenticated by the remote provider network.

At block 710, the connection management device establishes a connection with the remote provider network in accordance with the radio protocol based at least on the authentication of the connection management device using the security data stored by the hardware root of trust. At block 712, the connection management device receives API commands from the host device via the serial interface and perform actions at the connection management device in response to the commands (e.g., send, get, subscribe).

FIG. 8 is a high-level flowchart illustrating various methods and techniques to perform an over the air update (OTA) for a connection management device, according to some embodiments.

At block 802, the connection management device receives, from the provider network, a new firmware image to update the connection management device; the new firmware image is stored at a data store. At block 804, the connection management device verifies the integrity of the new firmware image. At block 806, subsequent to the verification of integrity, the connection management device notifies the host device of the new firmware image at the connection management device. At block 808, the connection management device receives, from the host device, a command to reboot. At block 810, the connection management device initiates a reboot of the connection management device to update the connection management device using the new firmware image.

FIG. 9 is a high-level flowchart illustrating various methods and techniques to perform an over the air update (OTA) for a host device, according to some embodiments.

At block 902, the connection management device receives, from the provider network, an envelope that includes a new firmware image to update the host device; the envelope is stored at a data store. At block 904, the connection management device verifies integrity and authenticity of the envelope. At block 906, the connection management device notifies the host device of the new firmware image that has been verified and authenticated.

At block 908, the connection management device receives, from the host device, a retrieve command to retrieve the new firmware image. At block 910, the connection management device sends the new firmware image to the host device. At block 912, the connection management device receives, from the host device, an indication that the host device was successfully updated using the new firmware image. At block 914, the connection management device sends, to the provider network, a notification that the host device was successfully updated using the new firmware image.

The methods described herein may in various embodiments be implemented by any combination of hardware and software. For example, in one embodiment, the methods may be implemented by a computer system (e.g., a computer system as in FIG. 10) that includes one or more processors executing program instructions stored on a computer-readable storage medium coupled to the processors. The program instructions may implement the functionality described herein (e.g., the functionality of the connection management device, host device, services, and any other components that implement the techniques described herein). The various methods as illustrated in the figures and described herein represent example embodiments of methods. The order of any method may be changed, and various elements may be added, reordered, combined, omitted, modified, etc.

Figure 10:
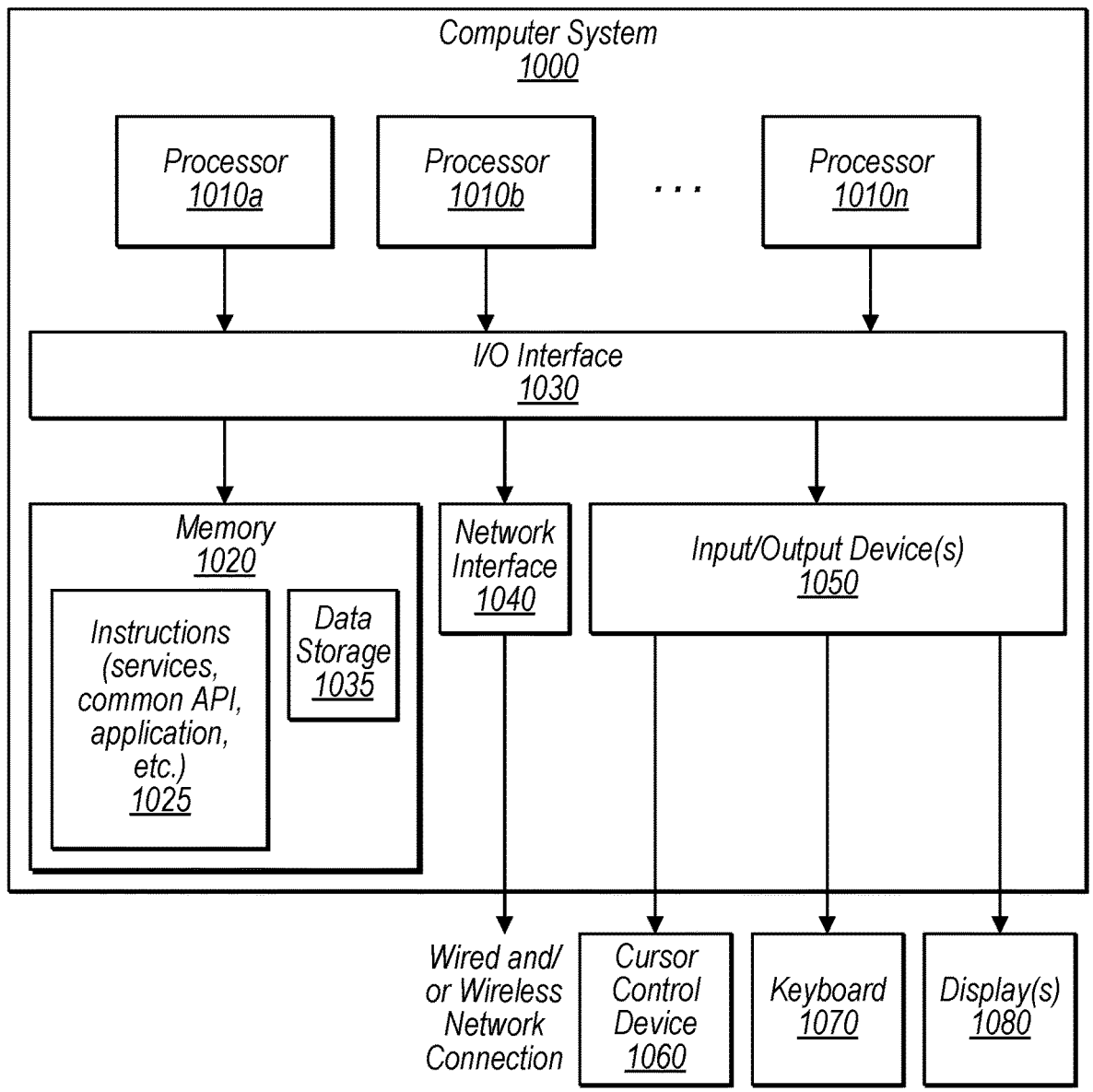
FIG. 10 is a block diagram illustrating an example computing system, according to some embodiments.

Embodiments to implement using a connection management device and a common API to securely connect to a provider network, which may interact with various other systems or devices. One such computer system is illustrated by FIG. 10. In different embodiments, computer system 1000 may be any of various types of devices, including, but not limited to, a personal computer system, desktop computer, laptop, notebook, or netbook computer, mainframe computer system, handheld computer, workstation, network computer, a camera, a set top box, a mobile device, a consumer device, video game console, handheld video game device, application server, storage device, a peripheral device such as a switch, modem, router, or in general any type of computing node or compute node, computing device, compute device, or electronic device.

In the illustrated embodiment, computer system 1000 includes one or more processors 1010 coupled to a system memory 1020 via an input/output (I/O) interface 1030. Computer system 1000 further includes a network interface 1040 coupled to I/O interface 1030, and one or more input/output devices 1050, such as cursor control device 1060, keyboard 1070, and display(s) 1080. Display(s) may include standard computer monitor(s) and/or other display systems, technologies or devices, in one embodiment. In some embodiments, it is contemplated that embodiments may be implemented using a single instance of computer system 1000, while in other embodiments multiple such systems, or multiple nodes making up computer system 1000, may host different portions or instances of embodiments. For example, in one embodiment some elements may be implemented via one or more nodes of computer system 1000 that are distinct from those nodes implementing other elements.

In various embodiments, computer system 1000 may be a uniprocessor system including one processor 1010, or a multiprocessor system including several processors 1010 (e.g., two, four, eight, or another suitable number). Processors 1010 may be any suitable processor capable of executing instructions, in one embodiment. For example, in various embodiments, processors 1010 may be general-purpose or embedded processors implementing any of a variety of instruction set architectures (ISAs), such as the x86, PowerPC, SPARC, or MIPS ISAs, or any other suitable ISA. In multiprocessor systems, each of processors 1010 may commonly, but not necessarily, implement the same ISA.

In some embodiments, at least one processor 1010 may be a graphics processing unit. A graphics processing unit or GPU may be considered a dedicated graphics-rendering device for a personal computer, workstation, game console or other computing or electronic device, in one embodiment. Modern GPUs may be very efficient at manipulating and displaying computer graphics, and their highly parallel structure may make them more effective than typical CPUs for a range of complex graphical algorithms. For example, a graphics processor may implement a number of graphics primitive operations in a way that makes executing them much faster than drawing directly to the screen with a host central processing unit (CPU). In various embodiments, graphics rendering may, at least in part, be implemented by program instructions for execution on one of, or parallel execution on two or more of, such GPUs. The GPU(s) may implement one or more application programmer interfaces (APIs) that permit programmers to invoke the functionality of the GPU(s), in one embodiment.

System memory 1020 may store program instructions 1025 and/or data accessible by processor 1010, in one embodiment. In various embodiments, system memory 1020 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing desired functions, such as those described above (e.g., the anomaly detection service and any other components) are shown stored within system memory 1020 as program instructions 1025 and data storage 1035, respectively. In other embodiments, program instructions and/or data may be received, sent or stored upon different types of computer-accessible media or on similar media separate from system memory 1020 or computer system 1000. A computer-accessible medium may include non-transitory storage media or memory media such as magnetic or optical media, e.g., disk or CD/DVD-ROM coupled to computer system 1000 via I/O interface 1030. Program instructions and data stored via a computer-accessible medium may be transmitted by transmission media or signals such as electrical, electromagnetic, or digital signals, which may be conveyed via a communication medium such as a network and/or a wireless link, such as may be implemented via network interface 1040, in one embodiment.

In one embodiment, I/O interface 1030 may be coordinate I/O traffic between processor 1010, system memory 1020, and any peripheral devices in the device, including network interface 1040 or other peripheral interfaces, such as input/output devices 1050. In some embodiments, I/O interface 1030 may perform any necessary protocol, timing or other data transformations to convert data signals from one component (e.g., system memory 1020) into a format suitable for use by another component (e.g., processor 1010). In some embodiments, I/O interface 1030 may include support for devices attached through various types of peripheral buses, such as a variant of the Peripheral Component Interconnect (PCI) bus standard or the Universal Serial Bus (USB) standard, for example. In some embodiments, the function of I/O interface 1030 may be split into two or more separate components, such as a north bridge and a south bridge, for example. In addition, in some embodiments some or all of the functionality of I/O interface 1030, such as an interface to system memory 1020, may be incorporated directly into processor 1010.

Network interface 1040 may allow data to be exchanged between computer system 1000 and other devices attached to a network, such as other computer systems, or between nodes of computer system 1000, in one embodiment. In various embodiments, network interface 1040 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 1050 may, in some embodiments, include one or more display terminals, keyboards, keypads, touchpads, scanning devices, voice or optical recognition devices, or any other devices suitable for entering or retrieving data by one or more computer system 1000, in one embodiment. Multiple input/output devices 1050 may be present in computer system 1000 or may be distributed on various nodes of computer system 1000, in one embodiment. In some embodiments, similar input/output devices may be separate from computer system 1000 and may interact with one or more nodes of computer system 1000 through a wired or wireless connection, such as over network interface 1040.

As shown in FIG. 10, memory 1020 may include program instructions 1025 that implement the various embodiments of the systems as described herein, and data store 1035, comprising various data accessible by program instructions 1025, in one embodiment. In one embodiment, program instructions 1025 may include software elements of embodiments as described herein and as illustrated in the Figures. Data storage 1035 may include data that may be used in embodiments (e.g., commands, security data, messages, etc.). In other embodiments, other or different software elements and data may be included.

Those skilled in the art will appreciate that computer system 1000 is merely illustrative and is not intended to limit the scope of the embodiments as described herein. In particular, the computer system and devices may include any combination of hardware or software that can perform the indicated functions, including a computer, personal computer system, desktop computer, laptop, notebook, or netbook computer, mainframe computer system, handheld computer, workstation, network computer, a camera, a set top box, a mobile device, network device, internet appliance, PDA, wireless phones, pagers, a consumer device, video game console, handheld video game device, application server, storage device, a peripheral device such as a switch, modem, router, or in general any type of computing or electronic device. Computer system 1000 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-readable medium separate from computer system 1000 may be transmitted to computer system 1000 via transmission media or signals such as electrical, electromagnetic, or digital signals, conveyed via a communication medium such as a network and/or a wireless link. This computer readable storage medium may be non-transitory. Various embodiments may further include receiving, sending or storing instructions and/or data implemented in accordance with the foregoing description upon a computer-accessible medium. Accordingly, the present invention may be practiced with other computer system configurations.

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, non-volatile media such as RAM (e.g., SDRAM, DDR, RDRAM, SRAM, etc.), ROM, etc., as well as transmission media or signals such as electrical, electromagnetic, or digital signals, conveyed via a communication medium such as network and/or a wireless link.

The various methods as illustrated in the Figures and described herein represent example embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended that the invention embrace all such modifications and changes and, accordingly, the above description to be regarded in an illustrative rather than a restrictive sense.

What is claimed is:

1. A connection management device, the connection management device comprising:
    a hardware interface connected to a host device, wherein the host device is unable to communicate with the connection management device other than through the hardware interface according to a defined set of commands;
    a connectivity module configured to communicate according to a communication protocol;
    a pre-provisioned hardware root of trust, wherein the hardware root of trust securely stores security data configured to authenticate the connection management device with a remote provider network;
    one or more processors; and
    one or more memories, wherein the one or more memories have stored thereon instructions, which when executed by the one or more processors, cause the one or more processors to:
        implement an application programming interface (API), wherein the API comprises the set of commands to use the connection management device, wherein the set of commands comprises a connection command to cause the connection management device to connect to the provider network, wherein the connection command is not specific to any particular communication protocol, and wherein the host device is unable to use the connection management device other than through the set of commands of the API;
        receive, from the host device via the hardware interface, the connection command to connect to the provider network, wherein the connection command is not specific to a communication protocol used by the connection management device, and wherein the connection command does not indicate the security data or other security data configured to authenticate the connection management device; and
        in response to the reception, from the host device, of the connection command:
            perform commands specific to the communication protocol used by the connection management device to cause the connection management device to communicate with the remote provider network;
            use the security data of the hardware root of trust to cause the connection management device to be authenticated by the remote provider network; and
            establish a connection with the remote provider network in accordance with the communication protocol based at least on the authentication of the connection management device using the security data stored by the hardware root of trust.

2. The connection management device as recited in claim 1, wherein the connection command does not specify an endpoint for the connection management device to connect to, and wherein, prior to the reception of the connection command, the connection management device is provisioned to connect to the endpoint in response to the reception of the connection command.

3. The connection management device as recited in claim 1, wherein the instructions cause the one or more processors to, subsequent to the establishment of the connection with the remote provider network:
    receive, from the host device via the hardware interface:
        a send command that indicates a message and a topic, wherein the send command causes the connection management device to publish the message to the topic, or
        a get command, wherein the get command causes the connection management device to send, to the host device, a next message of a plurality of messages at the connection management device according to an order that the plurality of messages was received by the connection management device.

4. The connection management device as recited in claim 1, wherein the connection management device further comprises a data store, and wherein the instructions cause the one or more processors to, subsequent to the establishment of the connection with the remote provider network:
    receive, from the provider network, a new firmware image to update the connection management device, wherein the new firmware image is stored at the data store;
    verify integrity of the new firmware image;
    subsequent to the verification of integrity, notify the host device of the new firmware image at the connection management device;
    subsequent to the notification of the host device, receive, from the host device, a command to reboot; and
    in response to the reception of the command to reboot, initiate a reboot of the connection management device to update the connection management device using the new firmware image.

5. The connection management device as recited in claim 1, wherein the connection management device further comprises a data store, and wherein the instructions cause the one or more processors to, subsequent to the establishment of the connection with the remote provider network:
- receive, from the provider network, an envelope comprising a new firmware image to update the host device, wherein the envelope is stored at the data store;
- verify integrity of the envelope and authenticity of the envelope;
- subsequent to the verification of integrity and authenticity, notify the host device of the new firmware image;
- subsequent to the notification of the host device, receive, from the host device, a retrieve command to retrieve the new firmware image;
- in response to the retrieve command, send, to the host device, the new firmware image; and
- receive, from the host device, an indication that the host device was successfully updated using the new firmware image; and
- send, to the provider network, a notification that the host device was successfully updated using the new firmware image.

6. A method, comprising:
performing, by a connection management device:
- implementing an application programming interface (API), wherein the API comprises a set of commands to use the connection management device, wherein the set of commands comprises a connection command to cause the connection management device to connect to a remote provider network, and wherein a host device is unable to use the connection management device other than through the set of commands of the API;
- receiving, from the host device, the connection command, wherein the connection command is not specific to a communication protocol used by the connection management device, and wherein the connection command does not indicate security data to authenticate the connection management device; and
- in response receiving the connection command from the host device:
  - performing commands specific to the communication protocol used by the connection management device to cause the connection management device to communicate with the remote provider network;
  - using the security data stored by a hardware root of trust of the connection management device to cause the connection management device to be authenticated by the remote provider network; and
  - establishing, by the connection management device, a connection with the remote provider network in accordance with the communication protocol based at least on the authentication of the connection management device using the security data stored by the hardware root of trust.

7. The method as recited in claim 6, wherein the connection command does not specify an endpoint for the connection management device to connect to, and wherein the connection command is received via a serial interface of the connection management device.

8. The method as recited in claim 6, wherein the method further comprises, subsequent to the establishment of the connection with the remote provider network:
- receiving, from the host device via a hardware interface:
  - a send command that indicates a message and a topic, wherein the send command causes the connection management device to publish the message to the topic.

9. The method as recited in claim 8, wherein the message comprises data collected by a sensor at the host device.

10. The method as recited in claim 6, wherein the method further comprises, subsequent to the establishment of the connection with the remote provider network:
- receiving, from the provider network, a new firmware image to update the connection management device, wherein the new firmware image is stored at the data store;
- notifying the host device of the new firmware image at the connection management device;
- subsequent to notifying the host device, receiving, from the host device, a command to reboot; and
- in response to receiving the command to reboot, initiating a reboot of the connection management device to update the connection management device using the new firmware image.

11. The method as recited in claim 6, wherein the method further comprises, subsequent to the establishment of the connection with the remote provider network:
- receiving, from the provider network, an envelope comprising a new firmware image to update the host device, wherein the envelope is stored at the data store;
- verifying integrity of the envelope and authenticity of the envelope;
- notifying the host device of the new firmware image;
- subsequent to notifying the host device, receiving, from the host device, a retrieve command to retrieve the new firmware image;
- in response to the retrieve command, sending, to the host device, the new firmware image; and
- receiving, from the host device, an indication that the host device was successfully updated using the new firmware image; and
- sending, to the provider network, a notification that the host device was successfully updated using the new firmware image.

12. The method as recited in claim 6, wherein the security data stored by the hardware root of trust comprises one or more encryption keys, and wherein the one or more encryption keys are pre-provisioned by the provider network.

13. The method as recited in claim 6, wherein the communication protocol comprises a radio communication protocol.

14. The method as recited in claim 6, wherein the connection management device is pre-provisioned with an endpoint for a staging account at the provider network, wherein the connection management device automatically connects to the endpoint in response to activation of the connection management device by a user.

15. One or more non-transitory computer-accessible storage media storing program instructions that when executed on or across one or more processors of a connection management device cause the one or more processors to:
- implement an application programming interface (API) that comprises a set of commands, wherein the set of commands comprises a connection command to cause the connection management device to connect to a remote provider network, and wherein a host device is unable to use the connection management device other than through the set of commands of the API;
- receive, from the host device, the connection command, wherein the connection command is not specific to a communication protocol used by the connection management device, and wherein the connection command does not indicate security data to authenticate the connection management device; and in response the reception of the connection command from the host device:
- perform commands specific to the communication protocol used by the connection management device to cause the connection management device to communicate with the remote provider network;
- use the security data stored by the connection management device to cause the connection management device to be authenticated by the remote provider network; and
- establish a connection with the remote provider network in accordance with the communication protocol based at least on the authentication of the connection management device using the security data.

16. The one or more storage media as recited in claim 15, wherein the connection command does not specify an endpoint for the connection management device to connect to.

17. The one or more storage media as recited in claim 15, wherein the program instructions when executed on or across the one or more processors further cause the one or more processors to, subsequent to the establishment of the connection with the remote provider network:

receive, from the host device via a hardware interface:
- a send command that indicates a message and a topic, wherein the send command causes the connection management device to publish the message to the topic, or
- a get command, wherein the get command causes the connection management device to send, to the host device, a next message of a plurality of messages at the connection management device according to an order that the plurality of messages was received by the connection management device.

18. The one or more storage media as recited in claim 15, wherein the program instructions when executed on or across the one or more processors further cause the one or more processors to, subsequent to the establishment of the connection with the remote provider network:

receive, from the provider network, a new firmware image to update the connection management device, wherein the new firmware image is stored at a data store;
verify integrity of the new firmware image;
subsequent to the verification of integrity, notify the host device of the new firmware image at the connection management device;
subsequent to the notification of the host device, receive, from the host device, a command to reboot; and
in response to the reception of the command to reboot, initiate a reboot of the connection management device to update the connection management device using the new firmware image.

19. The one or more storage media as recited in claim 15, wherein the program instructions when executed on or across the one or more processors further cause the one or more processors to, subsequent to the establishment of the connection with the remote provider network:

receive, from the provider network, an envelope comprising a new firmware image to update the host device, wherein the envelope is stored at a data store;
verify integrity of the envelope and authenticity of the envelope;
subsequent to the verification of integrity and authenticity, notify the host device of the new firmware image;
subsequent to the notification of the host device, receive, from the host device, a retrieve command to retrieve the new firmware image;
in response to the retrieve command, send, to the host device, the new firmware image; and
receive, from the host device, an indication that the host device was successfully updated using the new firmware image; and
send, to the provider network, a notification that the host device was successfully updated using the new firmware image.

20. The one or more storage media as recited in claim 15, wherein the program instructions when executed on or across the one or more processors further cause the one or more processors to, subsequent to the establishment of the connection with the remote provider network:

receive, from the host device, additional data;
determine that the additional data is not at least a portion of one of the set of commands of the API; and
in response to the determination that the additional data is not at least a portion of one of the set of commands of the application programming interface (API), sending to the host device an indication that the additional data is not a valid command.

\* \* \* \* \*